United States Patent
Tanaka (10) Patent No.: US 9,047,031 B2
(45) Date of Patent: Jun. 2, 2015

(54) PROCESS-RELATED RECORD INFORMATION RECORDING DEVICE AND METHOD

(71) Applicant: Hiroyuki Tanaka, Fukuoka (JP)

(72) Inventor: Hiroyuki Tanaka, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 25 days.

(21) Appl. No.: 14/266,951

(22) Filed: May 1, 2014

(65) Prior Publication Data
US 2014/0233064 A1    Aug. 21, 2014

Related U.S. Application Data

(63) Continuation of application No. 12/437,598, filed on May 8, 2009, now Pat. No. 8,749,814.

(30) Foreign Application Priority Data

May 28, 2008    (JP) ................. 2008-139759

(51) Int. Cl.
| | | |
|---|---|---|
| *G06F 3/12* | (2006.01) | |
| *G06F 21/60* | (2013.01) | |
| *H04L 29/06* | (2006.01) | |
| *H04N 1/00* | (2006.01) | |
| *H04N 1/44* | (2006.01) | |

(52) U.S. Cl.
CPC ............ *G06F 3/1273* (2013.01); *G06F 21/606* (2013.01); *H04L 63/1425* (2013.01); *H04N 1/00244* (2013.01); *H04N 1/00344* (2013.01); *H04N 1/0084* (2013.01); *H04N 1/00856* (2013.01); *H04N 1/00877* (2013.01); *H04N 1/4486* (2013.01); *G06F 3/1284* (2013.01); *G06F 2221/2101* (2013.01); *H04N 2201/0039* (2013.01); *H04N 2201/3202* (2013.01)

(58) Field of Classification Search
USPC ..................... 358/1.1–3.29; 369/240.1–52.1; 711/1–221; 719/311–332
See application file for complete search history.

(56) References Cited

U.S. PATENT DOCUMENTS

| | | | |
|---|---|---|---|
| 2002/0124167 A1 | 9/2002 | Toyota et al. | |
| 2003/0072023 A1 | 4/2003 | Tanaka | |
| 2003/0149897 A1* | 8/2003 | Ylitalo et al. | ................ 713/201 |

(Continued)

FOREIGN PATENT DOCUMENTS

| | | |
|---|---|---|
| JP | 2002-259305 | 9/2002 |
| JP | 2003-216310 | 7/2003 |

(Continued)

OTHER PUBLICATIONS

Japanese Office Action dated Dec. 6, 2011.

(Continued)

*Primary Examiner* — Marcellus Augustin
(74) *Attorney, Agent, or Firm* — IPUSA, PLLC (57) ABSTRACT

An image forming device is capable of executing an application. In the image forming device, a determining unit is configured to determine, in response to a request of execution of a communication process from the application, whether the communication process is an encrypted communication based on contents of a call stack which stores the request. A log recording unit is configured to record log information of the communication process in a storage device when the communication process is determined as being an encrypted communication.

15 Claims, 8 Drawing Sheets

(56) References Cited

U.S. PATENT DOCUMENTS

| | | | |
|---|---|---|---|
| 2004/0125402 A1* | 7/2004 | Kanai et al. | 358/1.15 |
| 2005/0226641 A1 | 10/2005 | Ando et al. | |
| 2006/0041840 A1 | 2/2006 | Blair et al. | |
| 2007/0061775 A1 | 3/2007 | Tanaka | |
| 2007/0230486 A1 | 10/2007 | Zafirov | |
| 2007/0233719 A1 | 10/2007 | Ikeda et al. | |
| 2007/0277157 A1 | 11/2007 | DeWitt et al. | |
| 2008/0074683 A1* | 3/2008 | Yanamura et al. | 358/1.2 |
| 2008/0219445 A1* | 9/2008 | Yato et al. | 380/255 |
| 2008/0235765 A1 | 9/2008 | Shimizu | |
| 2008/0320495 A1* | 12/2008 | Akiyama et al. | 719/318 |

FOREIGN PATENT DOCUMENTS

| | | |
|---|---|---|
| JP | 2005-269619 | 9/2005 |
| JP | 2006-221671 | 8/2006 |
| JP | 2006-260404 | 9/2006 |
| JP | 2006-260596 | 9/2006 |
| JP | 2007-129733 | 5/2007 |
| JP | 2007-328770 | 12/2007 |
| JP | 2008-065490 | 3/2008 |
| JP | 2008-103903 | 5/2008 |

OTHER PUBLICATIONS

Japanese Office Action dated Nov. 12, 2013.

* cited by examiner

PROCESS-RELATED RECORD INFORMATION RECORDING DEVICE AND METHOD

CROSS-REFERENCE TO RELATED APPLICATIONS

The present application is a continuation of U.S. patent application Ser. No. 12/437,598, filed on May 8, 2009, which is based upon and claims the benefit of priority of Japanese Patent Application No. 2008-139759, filed on May 28, 2008. The disclosures of the prior applications are hereby incorporated herein in their entirety by reference.

BACKGROUND OF THE INVENTION

1. Field of the Invention

This invention relates to an image forming device, a log recording method, and a computer-readable recording medium, which are adapted to record log information concerning the processing performed by an application.

2. Description of the Related Art

In recent years, some image forming devices called multifunction peripherals, are provided with the environment for developing and deploying applications, and it is possible to develop and deploy new applications on the image forming devices even after the shipment by using the API (application programming interface) supplied by the environment. For example, see Japanese Laid-Open Patent Application No. 2005-269619.

The image forming device as disclosed in Japanese Laid-Open Patent Application No. 2005-269619 is able to implement not only the applications developed by the vendor of the image forming device but also the applications developed by the third vendor. Hence, it is possible to remarkably improve the ability to expand the functions of the image forming device.

However, an unspecified application may be implemented in the image forming device, and the security of the image forming device in such a case may be degraded. It is difficult to determine, prior to the implementation, whether operation of each of the individual applications is inappropriate for protection of confidential information in the image forming device.

In recent years, many image forming devices are provided with mass storage, and such image forming devices are capable of managing various kinds of confidential information (personal information of the users, image data of the scanned confidential documents, etc.) stored in the mass storage. Thus, it is desired to prevent an unspecified application from illegally accessing the confidential information in the image forming device.

Recording of log information is an effective mechanism for detecting existence of an unsuitable application which illegally accesses confidential information in the image forming device. However, according to the related art, it is necessary to implement a certain function (e.g., calling of a function of recording logs) into the application appropriately, in order to perform recording of log information.

In the case of the mechanism according to the related art, if the function is implemented in the application inappropriately, failure of recording of log information may occur. As a result, it is impossible to detect an unsuitable application which may illegally access the confidential information in the image forming device.

SUMMARY OF THE INVENTION

In one aspect of the invention, the present disclosure provides an improved image forming device in which the above-described problems are eliminated.

In one aspect of the invention, the present disclosure provides an image forming device, a log recording method, and a computer-readable recording medium, which are able to record appropriately log information with respect to a process performed by an application in the image forming device.

In an embodiment of the invention which solves or reduces one or more of the above-mentioned problems, the present disclosure provides an image forming device which is capable of executing an application, the image forming device comprising: a determining unit to determine, in response to a request of execution of a communication process from the application, whether the communication process is an encrypted communication based on contents of a call stack which stores the request; and a log recording unit to record log information of the communication process in a storage device when the communication process is determined as being an encrypted communication.

In an embodiment of the invention which solves or reduces one or more of the above-mentioned problems, the present disclosure provides a log recording method which is performed by an image forming device capable of executing an application, the log recording method comprising: determining, in response to a request of execution of a communication process from the application, whether the communication process is an encrypted communication based on contents of a call stack which stores the request; and recording log information of the communication process in a storage device when the communication process is determined as being an encrypted communication.

In an embodiment of the invention which solves or reduces one or more of the above-mentioned problems, the present disclosure provides a computer-readable recording medium, storing a program which, when executed by a processing unit of an image forming device capable of executing an application, causes the processing unit to perform a log recording method, the log recording method comprising: determining, in response to a request of execution of a communication process from the application, whether the communication process is an encrypted communication based on contents of a call stack which stores the request; and recording log information of the communication process in a storage device when the communication process is determined as being an encrypted communication.

Other objects, features and advantages of the present invention will become more apparent from the following detailed description when read in conjunction with the accompanying drawings.

DETAILED DESCRIPTION OF THE PREFERRED EMBODIMENTS

A description will be given of embodiments of the invention with reference to the accompanying drawings.

Figure 1:
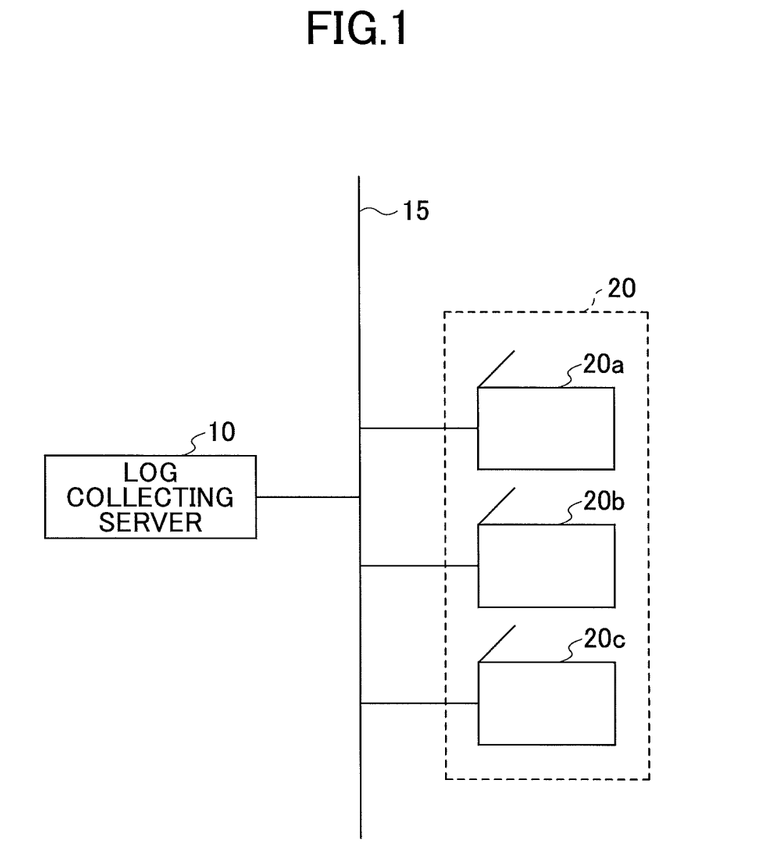
FIG. 1 is a diagram showing the composition of a system to which an embodiment of the invention is applied.

FIG. 1 shows the composition of a system to which an embodiment of the invention is applied. In the system shown in FIG. 1, a log collecting server 10, an image forming device 20*a*, an image forming device 20*b*, and an image forming device 20*c* are interconnected by a network 15, such as LAN (local area network) accommodated in an office. The network 15 may be a wired communication network or may be a wireless (radio) communication network.

Hereinafter, when the image forming devices 20*a*, 20*b*, 20*c*, etc. are referred to collectively, each device will be simply called the image forming device 20. For example, each of the image forming devices 20 may be a multi-function peripheral (MFP) in which multiple image-forming functions, including functions of a copier, a facsimile, a printer, and a scanner, are integrated in a single housing.

The log collecting server 10 is a computer which collects various kinds of log information generated in the image forming devices 20, and manages them collectively. Alternatively, two or more log collecting servers 10 may be arranged in the system of FIG. 1.

Figure 2:
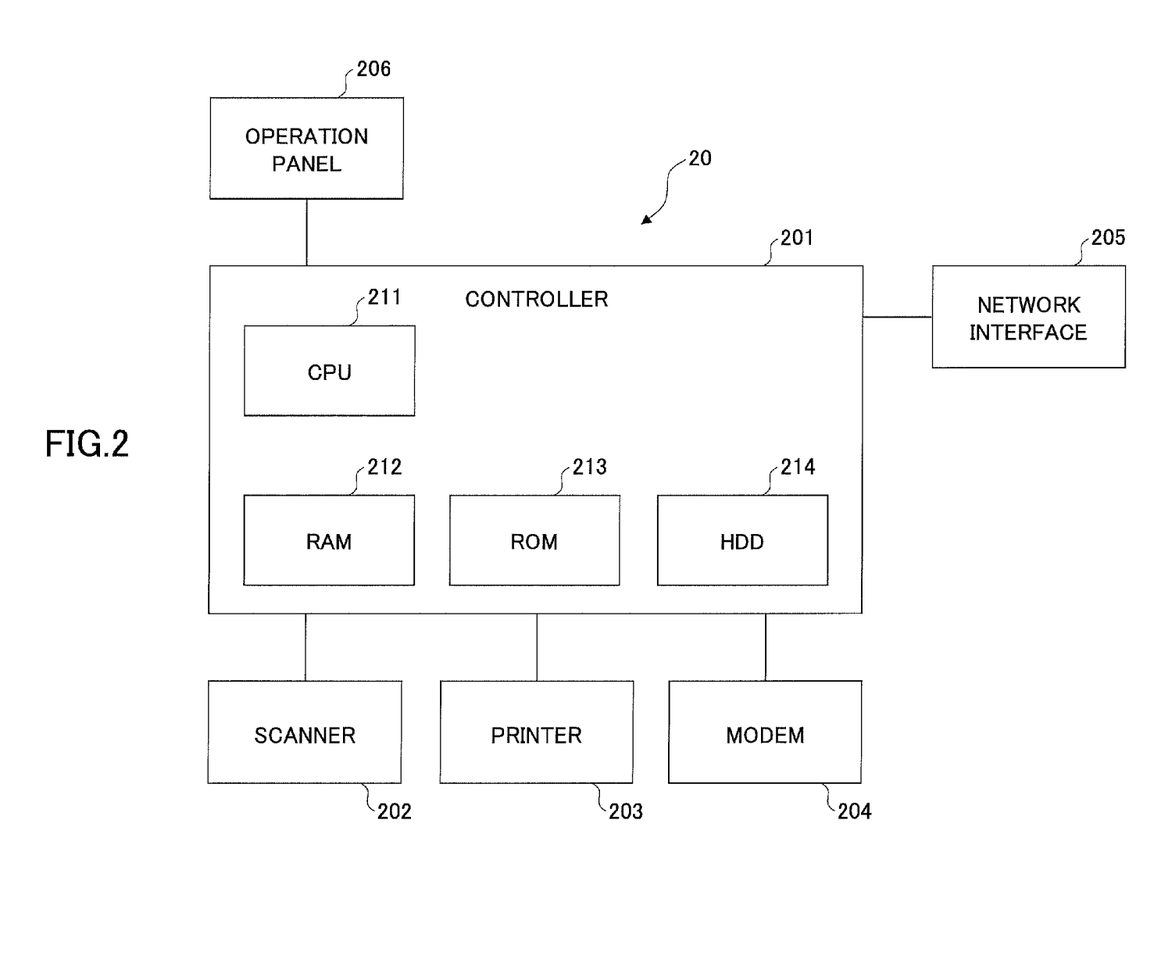
FIG. 2 is a block diagram showing the hardware composition of an image forming device of an embodiment of the invention.

FIG. 2 shows the hardware composition of an image forming device of an embodiment of the invention. As shown in FIG. 2, the image forming device 20 of this embodiment includes a controller 201, a scanner 202, a printer 203, a modem 204, a network interface 205, and an operation panel 206.

The controller 201 includes a CPU 211, a RAM 212, a ROM 213, and a HDD 214. The ROM 213 is arranged to store various kinds of programs and data used by the programs. Moreover, the ROM 213 may be arranged to store a program which, when executed by the CPU 211, causes the CPU 211 to perform a log recording method of an embodiment of the invention, which will be described later.

The RAM 212 is used as a program storage area to which programs are loaded, and used as a work area which is used by the loaded programs, etc. The CPU 211 carries out the functions of the image forming device 20 (which will be described later) by performing the procedure in accordance with the program loaded to the RAM 212.

The HDD 214 is arranged to store various kinds of data (for example, image data of scanned documents). Moreover, the HDD 214 may be arranged to store a program which, when executed by the CPU 211, causes the CPU 211 to perform a log recording method of an embodiment of the invention, which will be described later.

In the image forming device 20 of the embodiment shown in FIG. 2, at least one of the ROM 213 and the HDD 214 constitutes a computer-readable recording medium of an embodiment of the invention.

The scanner 202 is arranged to optically read image data from an original document. The printer 203 is arranged to print image data on a print sheet. The modem 204 is arranged to connect the image forming device 20 to a public telephone line, and the modem 204 is used to perform the transmission and reception of image data in accordance with the FAX communication protocol. The network interface 205 is arranged to connect the image forming device 20 to the network 15. The operation panel 206 is provided with a display unit, such as a liquid crystal panel, and operational buttons, which are arranged to receive data input from the user and output notices of operational information to the user.

The program which causes a computer (or the CPU 211 of the image forming device 20) to perform the log recording method according to the invention may be installed in the image forming device 20 in various manners. For example, a removable recording medium, such as an SD (secure digital) card, which stores the above-mentioned program in advance is inserted to the image forming device 20, and the program is read from the recording medium and installed in the image forming device 20 such that the program is executable by the CPU 211. The SD card in such a case may be a computer-readable recording medium of an embodiment of the invention. Alternatively, the above-mentioned program may be downloaded to the image forming device 20 via the network 15 and installed such that the program is executable by the CPU 211.

Figure 3:
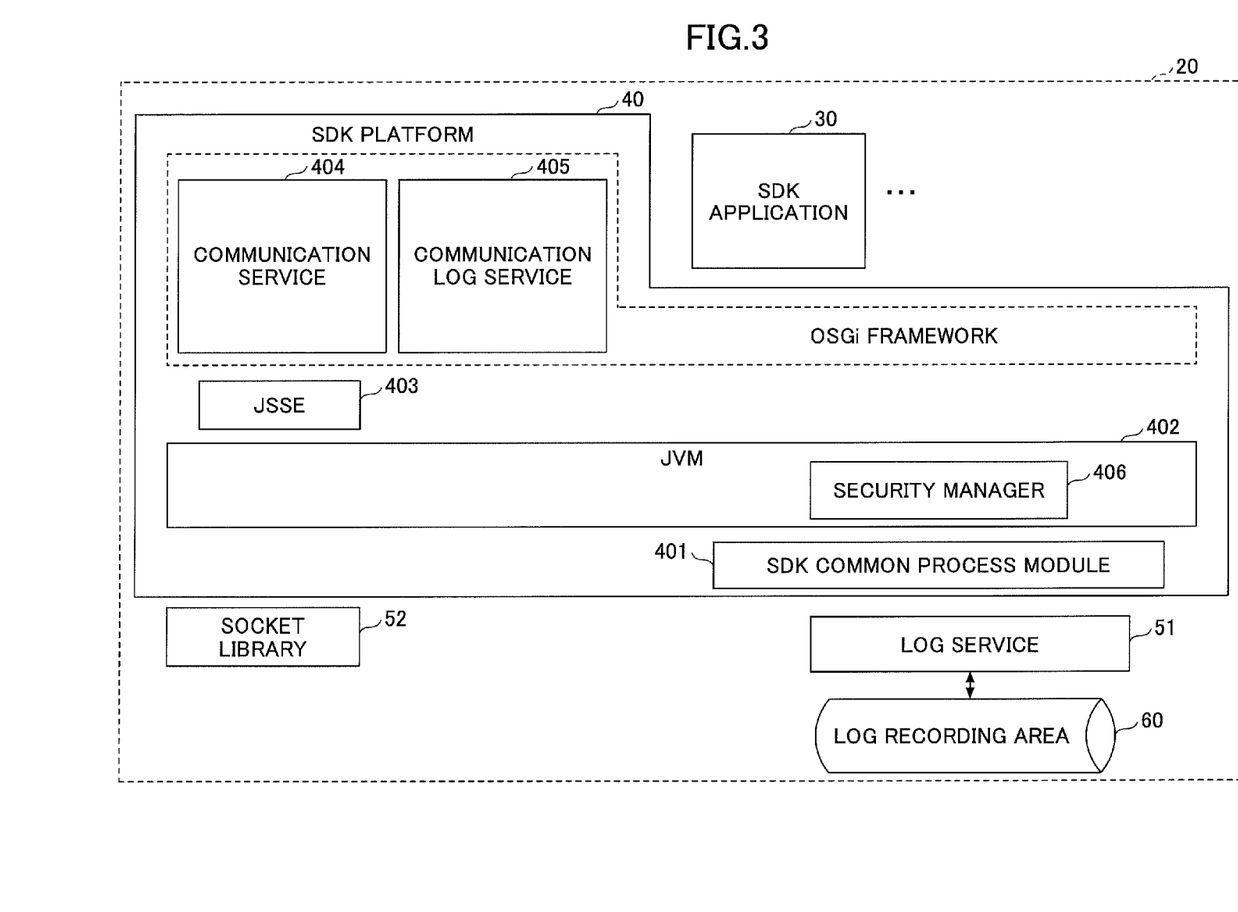
FIG. 3 is a block diagram showing the software composition of an image forming device of a first embodiment of the invention.

FIG. 3 shows the software composition of an image forming device of a first embodiment of the invention. The first embodiment relates to recording of communication logs (communication records).

As shown in FIG. 3, the software items of the image forming device 20 of this embodiment include an SDK (software development kit) application 30, an SDK platform 40, a log service 51, and a socket library 52. These software items are loaded to the RAM 212, and the corresponding function is performed by causing the CPU 211 to perform the processing of the corresponding software item.

The log service 51 is configured to record the logs of the communications (especially, encrypted communications) performed by the SDK application 30, in a log recording area 60. The SDK application 30 will be described later. Also, the log service 51 is configured to control the transmission of the logs, recorded in the log recording area 60, to the log collecting server 10.

The log storage area 60 is a storage area in the RAM 212 or the HDD 214 for recording the logs therein. The socket library 52 is a socket library arranged to provide the API used in TCP/IP communications, for the upper-layer modules.

The SDK platform 40 is a software platform arranged to provide the environment for executing the SDK application 30. In the composition of FIG. 3, a SDK common process module 401, a JVM (Java (registered trademark) virtual machine) 402, a JSSE (Java secure socket extension) 403, a communication service 404, and a communication log service 405 are contained in the SDK platform 40.

The JVM 402 converts the Java bytecodes into the native codes that can be run on the OS, and executes the native codes. The software components of the SDK platform 40 illustrated above the block of the JVM 402 in FIG. 3 are installed in the Java bytecodes. The JSSE 403 is a package of the security component of the Java standard edition platform. The JSSE 403 provides both an application programming interface (API) framework for the Java standard encrypted communication (e.g., SSL communication) and implementation of the API.

The communication service 404 and the communication log service 405 are bundles running on the OSGi (Open Service Gateway initiative) framework. The OSGi framework is the standardized technology by the OSGi alliance, which is a software platform to provide the execution environment for executing the software components developed based on the open software component technology using the Java language. The software components written in the Java language are implemented in the form of the bundles on the OSGi framework. A bundle is constituted by a JAR (Java archive) file, and such bundles can be dynamically installed independently of each other, without requiring the rebooting of the device.

The communication service 404 is configured to control the communication process according to the communication protocol of the application layer, such as HTTP (hypertext transfer protocol), FTP (file transfer protocol), SNMP (simple network management protocol) or LDAP (lightweight directory access protocol), and configured to provide the interface of the communication process to the SDK application 30. When a request of encrypted communication is received from the SDK application 30, the communication service 404 performs encrypted communication by using the JSSE 403. The communication log service 405 is configured to control the process of recording the log (communication log) when a communication request is received from the SDK application 30.

In addition, the class library concerning the Java standard classes and the extended classes for the image forming device 20 is also included in the SDK platform 40. For example, the security manager 406 is illustrated in FIG. 3 as a part of the JVM 402. The security manager 406 is implemented by the extended class of the Java standard security manager class. Hence, the security manager 406 restricts the accessing by the SDK application 30 to the resources, such as files, network sockets and the printer, in accordance with the access control information which is defined, in advance, in the policy file.

Specifically, the SDK platform 40 is arranged so that, each time the accessing to the resources takes place, a call is sent to the security manager 406. The security manager 406 determines the permission of accessing to the resources, in response to the call received. In this embodiment, by using this mechanism, the security manager 406 detects execution of the encrypted communication by the SDK application 30.

The SDK application 30 is an application which is developed by using the SDK (software development kit) dedicated for use in the SDK platform 40. It is possible to install two or more SDK applications 30 in the SDK platform 40.

Figure 4:
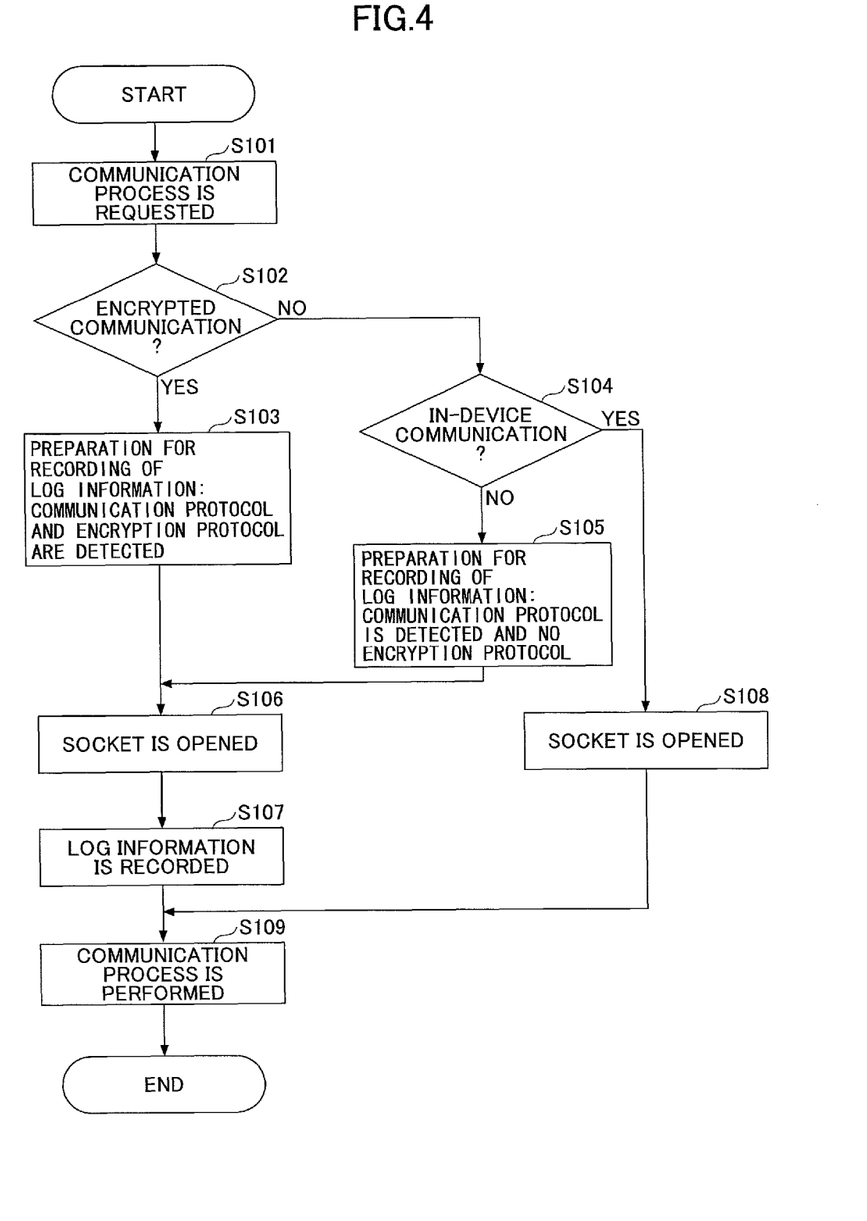
FIG. 4 is a flowchart for explaining the outline process performed by the image forming device of the first embodiment.

A description will be given of the procedure of the image forming device 20 of the first embodiment. FIG. 4 is a flowchart for explaining the outline process performed by the image forming device of the first embodiment.

In the image forming device 20, the SDK application 30, which is about to start communication, sends a request for performing the communication process to the SDK platform 40 (S101).

Next, the image forming device 20 determines whether the communication requested by the SDK application 30 is an encrypted communication (S102).

When it is determined in step S102 that the requested communication is an encrypted communication, the image forming device 20 performs the preparation for the recording of log information (S103). Specifically, the image forming device 20 detects the values of information items to be recorded as log information. For example, the image forming device 20 detects a communication protocol and an encryption protocol which are used for the requested communication.

Next, the image forming device 20 opens the communication socket (S106) and records the log information (S107).

Next, the image forming device 20 performs the communication process in accordance with the protocol specified by the SDK application 30 (S109).

On the other hand, when it is determined in S102 that the requested communication is not an encrypted communication, the image forming device 20 determines whether the requested communication is an in-device communication (S104). The in-device communication means an internal communication between the software components (or the programs) within the image forming device 20 (for example, an inter-process communication).

When it is determined in step S104 that the requested communication is not an in-device communication, the image forming the image forming device 20 detects the communication protocol used for the requested communication, in order to perform the preparation for the recording of log information (S105). In this case, the requested communication is not an encrypted communication, and the value of the encryption protocol is set to null. After the step S105 is performed, the steps S106-S109 are performed.

When it is determined in step S104 that the requested communication is an in-device communication, the image forming device 20 opens the communication socket (S108), and performs the communication process in accordance with the protocol specified by the SDK application 30 (S109). In the case of the in-device communication, the recording of log information is not performed. This is because the level of significance of the in-device communication from the viewpoint of security is considered relatively low. In other words, the level of significance of the communication between the image forming device 20 and an external device via the network is considered relatively high.

If the log information for all the in-device communication is recorded, the log recording area 60 will be full of the logs in a short time. When it is desired to further restrict the consumption of the log recording area 60, the image forming device 20 may be arranged so that the log information only for the encrypted communication is recorded. It is considered that, in the case of the encrypted communication, the content of the communication itself is important. Therefore, in such a case, the log information only for the encrypted communication is recorded, and it is possible to record the log information concerning the important communication and restrict the consumption of the log recording area 60 to a certain degree.

Figure 5:
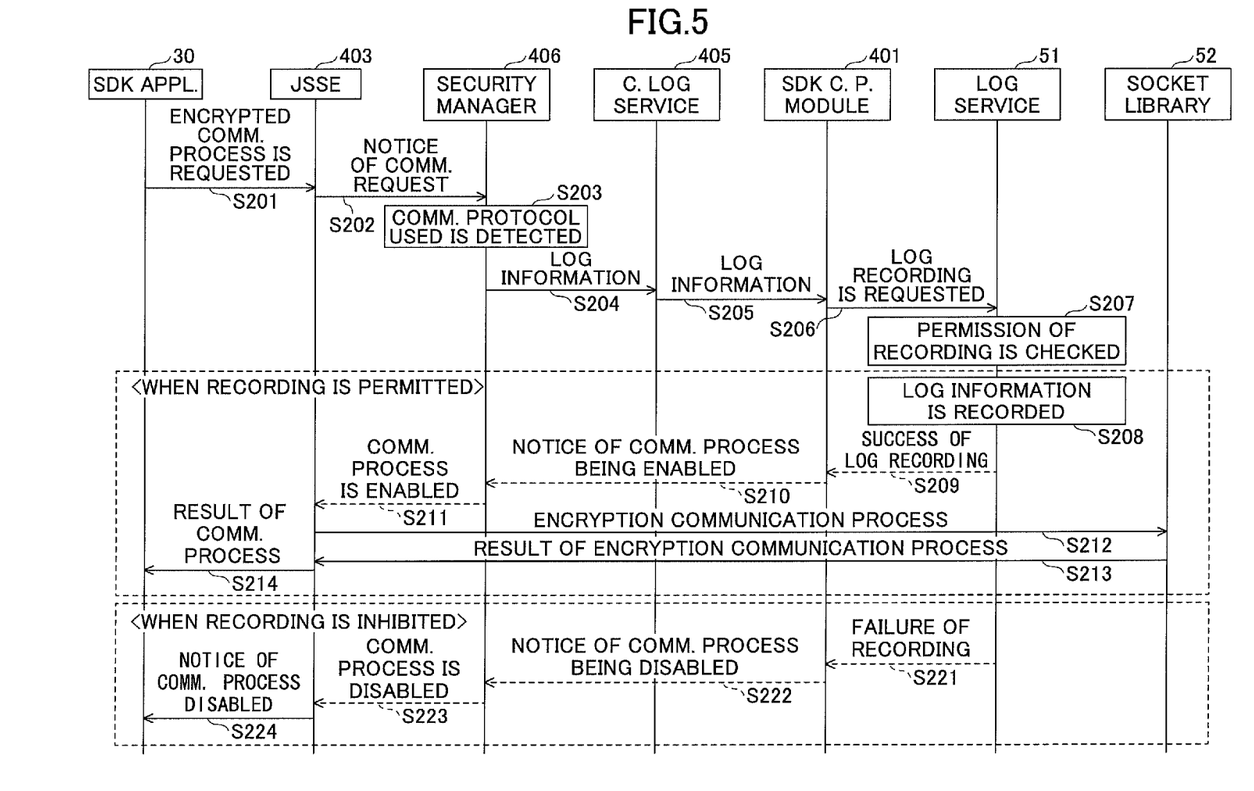
FIG. 5 is a sequence diagram for explaining the procedure of the image forming device of the first embodiment.

Next, a description will be given of the procedure of the image forming device of the first embodiment. FIG. 5 is a sequence diagram for explaining the procedure of the image forming device of the first embodiment.

If the SDK application 30 sends a request for performing an encrypted communication according to a desired one of the communication protocols (HTTP, FTP, SNMP, LDAP, etc.) to the communication service 404, the communication service 404 sends a request for performing the encrypted communication to the JSSE 403 (S201). For the sake of convenience, the illustration of the communication service 404 in FIG. 5 is omitted. For example, transmission of the request from the SDK application 30 to the communication service 404 is carried out by calling the method of a class according to a requested communication protocol. Namely, a class exists for each of the communication protocols contained in the communication service 404.

Similarly, transmission of the request from the communication service 404 to the JSSE 403 is carried out by calling the method of the class according to the communication requested by the SDK application 30 among the classes contained in the JSSE 403. The called class (the class in the JSSE 403) in this case may vary depending on the communication protocol specified by the SDK application 30, or on whether the communication as a client is requested or the communication as a server is requested.

The called class in the JSSE 403 notifies the security manager 406 that the class in the JSSE 403 has been called (which means occurrence of a communication request) (S202).

Next, the security manager 406 detects a communication protocol and an encryption protocol which are to be used for the requested communication (S203). The detection of the protocols is performed by the stack tracing. Generally, the calling relations between the classes (or the hierarchical conditions of the calls) are recorded in a stack (call stack) which is provided within the RAM 212. In step S203, the security manager 406 refers to the call stack in the RAM 212, traces the path of the call from the JSSE 403, and detects the called class (class name) in the JSSE 403 and the called class (class name) in the communication service 404.

Specifically, the communication protocol to be used is detected by the class name of the called class in the communication service 404, and, by the class name of the called class in the JSSE 403, the reception of a request of encrypted communication and the encryption protocol to be used for the encrypted communication are detected.

When the requested communication is not an encrypted communication, the calling of the method of the class in the JSSE 403 is not performed. Therefore, when a class concerning encrypted communication (the class in the JSSE 403) is not contained in the call stack, the security manager 406 determines that the requested communication is not an encrypted communication.

When the requested communication is an encrypted communication, the security manager 406 notifies, to the communication log service 405, identifiers (for example, protocol names) of the detected communication protocol and the detected encryption protocol as log information (S204). The communication log service 405 transmits the log information and a request of recording of the log information to the log service 51 via the SDK common process module 401 (S205, S206).

Next, the log service 51 checks the available capacity of the log recording area 60, and determines whether the recording of the log information is permitted (S207).

When the available capacity of the log recording area 60 is sufficient, the log service 51 records the log information in the log recording area 60 (S208). At this time, the log service 51 records the identifiers of the communication protocol and the encryption protocol, a time information, a log identifier, etc. The log identifier is an ID specific to each of one or more communication logs (one for each log recording).

Next, the log service 51 notifies the SDK common process module 401 that the recording of the log information has been done successfully (S209). After the recording of the log information has been done successfully, the SDK common process module 401 notifies the security manager 406 that performance of the communication process is enabled (S210).

In response to the notice from the SDK common process module 401, the security manager 406 transmits, to the JSSE 403, a response to the communication request in the step S202, indicating that performance of the communication process is enabled (S211). In response to the permission from the security manager 406, the JSSE 403 starts performing the communication process (e.g., communication start, transmission or reception of data, communication end) requested by the SDK application 30, using the socket library 52 (S212).

The JSSE 403 receives the information indicating a result of the communication process (success or failure of the communication process) from the socket library 52 (S213). Next, the JSSE 403 transmits the corresponding information to the SDK application 30 (S214).

On the other hand, when it is determined in step S207 that the log recording area 60 is full or nearly full of logs (or the available capacity of the log recording area 60 is below a predetermined value) and the recording of the log information is impossible, the log service 51 notifies the SDK common process module 401 of the failure of the recording of the log information (S221).

After the notice of failure of the recording of the log information is received, the SDK common process module 401 notifies the security manager 406 that performance of the communication process is disabled (S222). In response to the notice from the SDK common process module 401, the security manager 406 transmits to the JSSE 403 a response indicating that performance of the communication process by the communication request in step S202 is disabled (S223).

In response to the response from the security manager 406 about the disabled communication process, the JSSE 403 notifies the SDK application 30 that performance of the communication process requested by the SDK application 30 is disabled (S224).

Alternatively, the procedure of FIG. 5 may be arranged so that, when the log recording area 60 is full or nearly full of logs, the log service 51 transmits the log information of the logs recorded in the log recording area 60, to the log collecting server 10. In this case, if the log information after it is transmitted to the log collecting server 10 is deleted from the log recording area 60, it is possible to perform the communication process while holding the available capacity of the log recording area 60 at a sufficient level. However, when the storage of the log collecting server 10 at this time is full or nearly full of logs, the procedure of the steps S221-S224 is performed.

Transmission of the log information to the log collecting server 10 may be performed periodically. Alternatively, transmission of the log information to the log collecting server 10 may be performed each time the log information is recorded. The timing at which the log information should be transmitted to the log collecting server 10 may be set up in accordance with a setting parameter input by a system administrator using the operation panel 206. In this case, the content of the setting parameter (the information indicating the timing of the transmission) is stored into the HDD 214. The log service 51 refers to the content of the setting parameter stored in the HDD 214, and determines the timing of the transmission of the log information to the log collecting server 10.

As described above, according to the image forming device 20 of the first embodiment, the recording of the log information of encrypted communication can be compulsorily performed even if an explicit request for recording the log information is not received from the SDK application 30. It is possible to prevent the failure of recording the log information, and it is possible to increase the possibility of detection of an unsuitable SDK application 30.

Moreover, according to the image forming device 20 of the first embodiment, the log information of encrypted communication which is important for security can be recorded and a rapid increase of the amount of the accumulated log information can be avoided. When the recording of the log information is impossible, performance of the communication process is not permitted. It is possible to avoid the occurrence of the situation in which a communication process unsuitable for the image forming device is performed by a request from an unspecified application but no trace of the unsuitable process is left in the image forming device.

Next, a description will be given of an image forming device of a second embodiment of the invention. The second embodiment relates to recording of job logs (job records).

In the following, only the elements of the second embodiment which are different from the first embodiment will be explained. Unless otherwise specified, the elements in the second embodiment are essentially the same as corresponding elements in the first embodiment described above.

Figure 6:
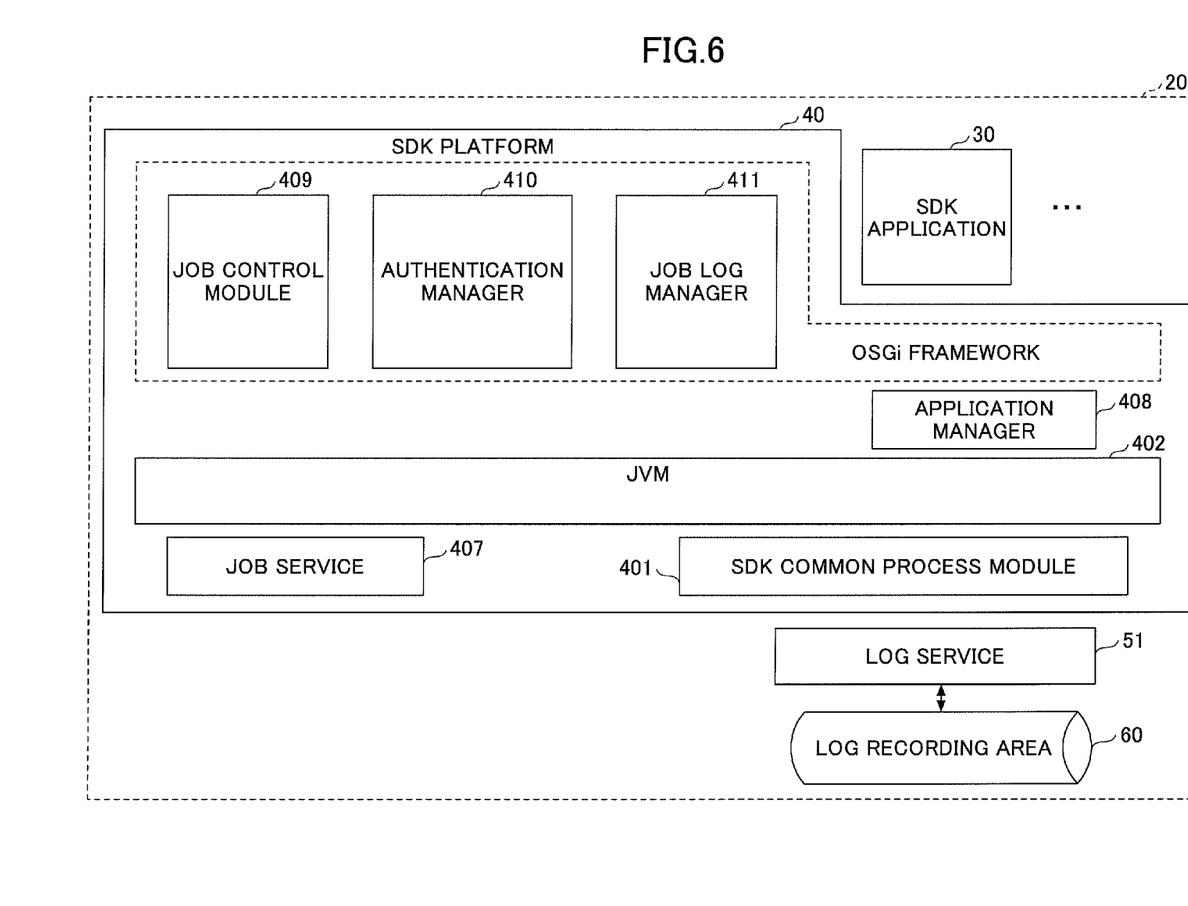
FIG. 6 is a block diagram showing the software composition of an image forming device of a second embodiment of the invention.

FIG. 6 shows the software composition of the image forming device of the second embodiment. In FIG. 6, the elements which are the same as the corresponding elements in FIG. 3 are designated by the same reference numerals, and a description thereof will be omitted.

In the composition of FIG. 6, a job service 407, an application manager 408, a job control module 409, an authentication manager 410, and a job log manager 411 are contained in the SDK platform 40.

The job service 407 controls the hardware resources of the image forming device 20 with respect to a job among the jobs (print, scan, copy, fax transmission, etc.) the execution of which is requested.

The application manager 408 manages the information concerning the SDK application 30 (which information is called application information). For example, at a time of installation of the SDK application 30, the correspondence information to associate a product ID of the SDK application 30 and an identifier (or application name) of the SDK application 30 is registered in the application manager 408. The application manager 408 records the correspondence information in the HDD 214 and manages the application information. The product ID is a unique ID assigned for each of individual products of the SDK application 30.

The job control module 409, the authentication manager 410, and the job log manager 411 are bundles running on the OSGi framework. The job control module 409 receives a request of execution of a job from the SDK application 30.

The authentication manager 410 performs authentication of a user when the user logs in the image forming device 20. User information (including a user name and a password) is stored in the HDD 214 of the image forming device 20. The authentication manager 410 authenticates the user based on the comparison of the stored user information with input user information (including a user name and a password), input to the login screen displayed on the operation panel 206. The user name and user ID of the authenticated user are retained in the RAM 212. The authenticated user is allowed as a login user to cause the image forming device 20 to perform a job using the SDK application 30 of the image forming device 20.

The job log manager 411 controls the recording process of a log (job log) in response to the request of execution of a job received from the SDK application 30.

Figure 7:
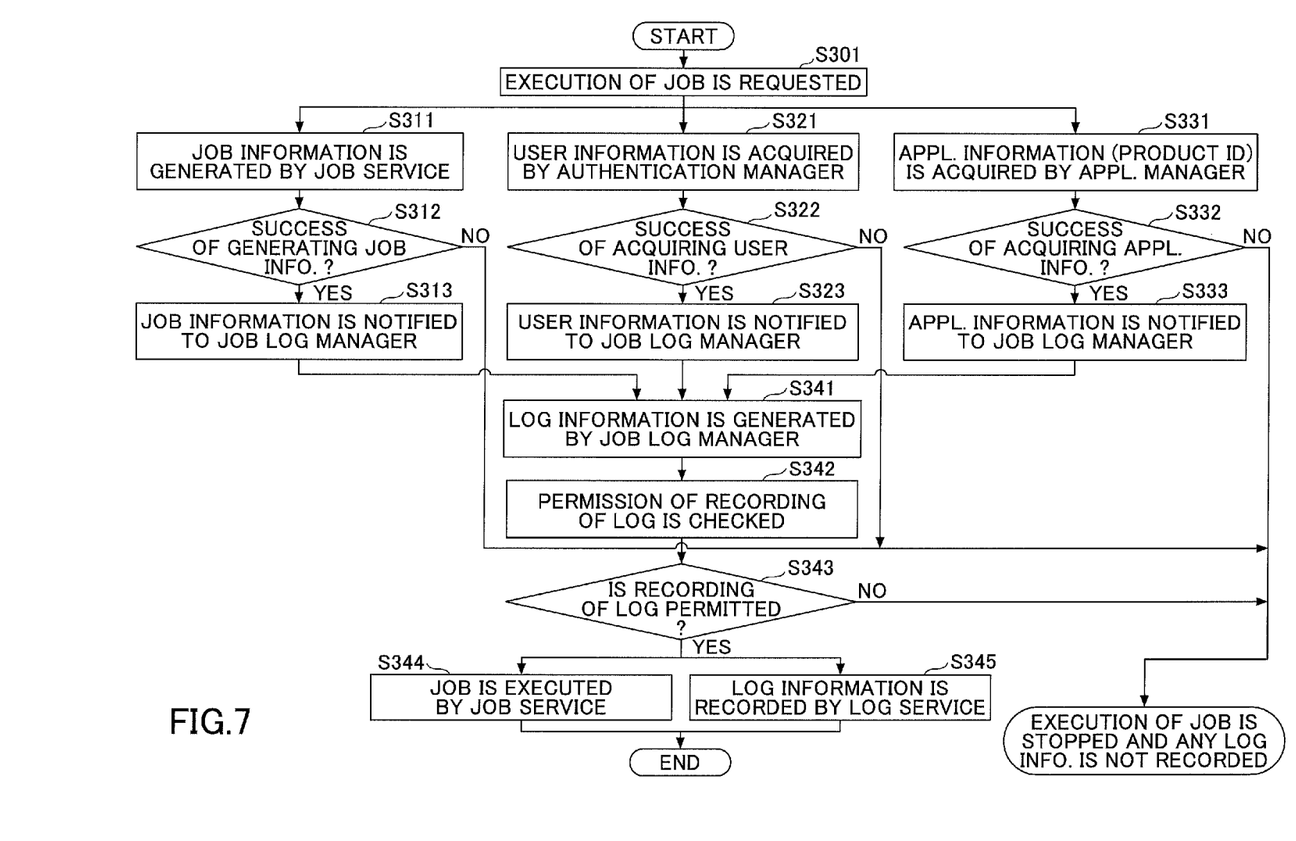
FIG. 7 is a flowchart for explaining the outline process performed by the image forming device of the second embodiment.

A description will be given of the procedure of the image forming device 20 of the second embodiment. FIG. 7 is a flowchart for explaining the outline process performed by the image forming device 20 of the second embodiment.

In the image forming device 20, the SDK application 30 outputs a request of execution of a job (print, scan, copy, or FAX transmission) which request is input by the user through the operation panel 206, to the SDK platform 40 (S301).

In response to the request of execution of the job, the job service 407 generates job information to be output as a job log (S311). For example, the job information contains the information (parameters) on the execution conditions of the job. For example, the parameters on the execution conditions of the job are input by the user concurrently with the inputting of the job execution request. When the job information is generated successfully in step S312, the job service 407 notifies the job log manager 411 of the generated job information (S313).

Moreover, in response to the request of execution of the job, the authentication manager 410 acquires from the RAM 212 the user information (user name and password) of the login user at the time of inputting the job execution request (S321). When the user information is acquired successfully in step S322, the authentication manager 410 notifies the job log manager 411 of the acquired user information (S323).

Moreover, in response to the request of execution of the job, the application manager 408 acquires the application information (product ID) of the SDK application 30 which is the source of the job execution request (S331). When the product ID is acquired successfully in step S332, the application manager 408 notifies the job log manager 411 of the acquired product ID (S333).

After the job information, the user information, and the product ID are received, the job log manager 411 generates log information including the received information items (S341).

Next, the log service 51 checks the available capacity of the log recording area 60, and determines whether the recording of the log information is permitted (S342).

When it is determined in step S343 that the recording of the log information is permitted, the job service 407 controls execution of the requested job (S344). The log service 51 records the log information in the log recording area 60 (S345). At this time, the job information, the user information, and the product ID are contained in the log information. Therefore, the log information, which indicates who has requested the job (the user information), which application has been used (the product ID) and which job has been performed (the job information), is recorded as a job log.

As shown in the flowchart of FIG. 7, in the respective cases in which the job information is not generated successfully in the step S312, the user information is not acquired successfully in the step S322, the product ID is not acquired successfully in the step S332, and the recording of the log information is impossible in the step S343, the execution of the job is stopped and the recording of the log information is not performed.

Figure 8:
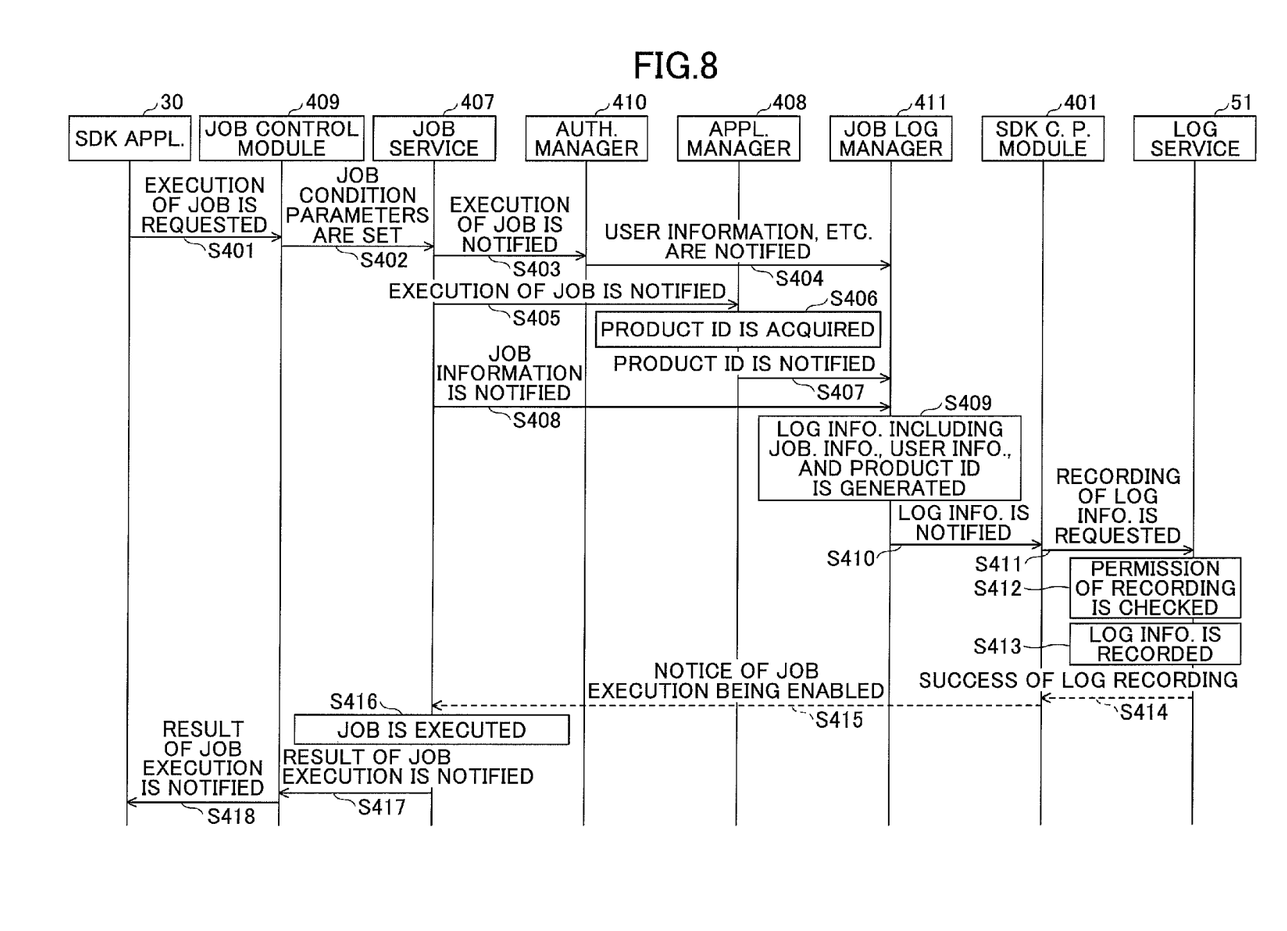
FIG. 8 is a sequence diagram for explaining the procedure of the image forming device of the second embodiment.

A description will be given of the procedure of the image forming device of the second embodiment. FIG. 8 is a sequence diagram for explaining the procedure of the image forming device of the second embodiment.

As shown in FIG. 8, the SDK application 30 outputs a request of execution of a job (print, scan, copy, FAX transmission, etc.) which request is input by the user through the operation panel 206, to the job control module 409 (S401). The parameters of the job executing conditions (job conditions) are contained in the execution request.

Next, the job control module 409 sends the parameters of the job conditions to the job service 407 and requests execution of the job to the job service 407 (S402).

Next, the job service 407 sends a notice of job execution indicating that the execution of the job is started, to both the authentication manager 410 and the application manager 408 (S403, S405). The job service 407 generates the job information including the job conditions, and notifies the job log manager 411 of the generated job information (S408).

In response to the notice of job execution (received in step S403), the authentication manager 410 acquires the user information (user name and password) of the current login user from the RAM 212, and notifies the job log manager 411 of the acquired user information (S404).

In response to the notice of job execution (received in step S405), the application manager 408 acquires the product ID of the SDK application 30 which is the source of the job execution request, based on the attribution information of the thread concerning the notice of job execution (S406).

In this embodiment, a thread group is used as the attribution information of the thread. The thread group is the Java standard mechanism which is constituted by a set of threads and thread groups. One or more threads can be associated with one thread group. A name (thread group name) may be attached to a thread group. In each thread, a thread group to which the thread belongs can be detected.

In this embodiment, a thread and a thread group are generated for each of the SDK applications 30 in the image forming device 20. Namely, one thread group is assigned to one SDK application 30, and the identifier (application name) of the SDK application 30 is set to the thread group name of the thread group.

In this embodiment, the job control module 409, the job service 407, and the application manager 408 are not the programs which operate as the processes or threads independently of each other, but constitute a program module (a set of functions or classes) which operates on the thread which is the same as that of the SDK application 30. Hence, the application manager 408 acquires the application name of the SDK application 30 which is the source of the job execution request, based on the thread group name of the thread group to which the thread of the application manager 408 belongs.

The application manager 408 acquires the product ID of the SDK application 30 which is the source of the job execution request, based on the acquired application name and the correspondence information to associate the application name, generated at the time of installation of the SDK application 30, with the product ID. Then, the application manager 408 notifies the job log manager 411 of the acquired product ID as identification information of the SDK application 30 which is the source of the job execution request (S407).

After the job information, the user information and the product ID are received, the job log manager 411 generates log information including the received information items (S409).

Next, the job log manager 411 requests recording of the generated log information to the log service 51 through the SDK common process module 401 (S410, S411).

Next, the log service 51 checks the available capacity of the log recording area 60, and determines whether the recording of the log information is permitted (S412).

When the available capacity of the log recording area 60 is sufficient, the log service 51 records the log information in the log recording area 60 (S413). At this time, the log service 51 records a time information, a log ID, etc., in addition to the job information, the user information and the product ID.

Next, the log service 51 notifies the SDK common process module 401 that the recording of the log information has been done successfully (S414). After the recording of the log information has been done successfully, the SDK common process module 401 notifies the job service 407 that execution of the job is enabled (S415).

In response to the notice, the job service 407 controls execution of the job requested by the SDK application 30 (S416). Next, the job service 407 transmits the information indicating the running state of the job (or a result of the job execution) to the SDK application 30 through the job control module 409 (S417, S418).

Alternatively, the procedure of FIG. 8 may be arranged so that, when the log service 51 determines in step S412 that the recording of the log information is impossible or inappropriate, the log service 51 transmits the log information currently recorded in the log recording area 60 to the log collecting server 10 via the network 15 and delete the log information from the log recording area 60 after the transmission is done. This procedure is similar to that in the previously described first embodiment. In addition, the timing of transmission of the log information to the log collecting server 10 may be selected in a manner similar to the first embodiment.

As described above, according to the image forming device 20 of the second embodiment, the recording of the log information with respect to the execution of a job can be compulsorily performed, even if an explicit request for recording the log information is not received from the SDK application 30. It is possible to prevent the failure of recording the log information, and it is possible to increase the possibility of detection of an unsuitable SDK application 30.

Moreover, according to the image forming device 20 of the second embodiment, when the recording of the log information is impossible, execution of the job is not permitted. It is possible to avoid the occurrence of the situation in which a job unsuitable for protection of the confidential information in the image forming device 20 is performed by a request from an unspecified application but no trace of execution of the unsuitable job is left in the image forming device.

Moreover, the image forming device of the first embodiment may be arranged so that the user information of a login user used at the time of an encrypted communication process and the identifier of the SDK application 30 which is the source requesting execution of an encrypted communication process are included in the log information and the log information is recorded in a manner similar to the second embodiment.

According to the present invention, it is possible to provide an image forming device, a log recording method, and a computer-readable recording medium, which are able to record appropriately log information with respect to a process performed by an application in the image forming device.

The present invention is not limited to the specifically disclosed embodiments, and variations and modifications may be made without departing from the scope of the present invention.

What is claimed is:

1. A device capable of executing an application program, comprising:
   a determination part configured to determine, in response to a request to execute a process from the application program, whether to permit recording of first record information related to the process in a recording area of a storage part,
   and request the recording of the first record information in the recording area in response to determining to permit the recording of the first record information,
   and transmit a duplicate of second record information recorded in the recording area to an external device connected to the device and request deletion of the second record information from the recording area in response to determining not to permit the recording of the first record information in the recording area;
   a recording part configured to record, the first record information in the recording area in response to the determination part requesting the recording of the first record information,
   and to delete the second record information from the recording area and thereafter record the first record information in the recording area in response to the determining requesting the deletion of the second record information;

and wherein the recording part is configured to record the first record information in the recording area when an available capacity of the external device is at or above a predetermined level, and to be prevented from recording the first record information in the recording area when the available capacity of the external device is below the predetermined level, in response to the determining part requesting the deletion of the second record information;

and a process execution part configured to execute the process in response to the recording part recording the first record information in the recording area.

2. The device as claimed in claim 1, wherein the recording part is configured to include identification information of a user pertaining to the request in the first record information.

3. The device as claimed in claim 1, wherein the recording part is configured to include identification information of the application program pertaining to the request in the first record information.

4. The device as claimed in claim 1, wherein the recording part is configured to include a parameter of the process in the first record information.

5. A record information recording method executed by a device capable of executing an application program, comprising:

determining, in response to a request to execute a process from the application program, whether to permit recording of first record information related to the process in a recording area of a storage part;

requesting the recording of the first record information in the recording area in response to said determining to permit the recording of the first record information, and transmitting a duplicate of second record information recorded in the recording area to an external device connected to the device and requesting deletion of the second record information from the recording area in response to said determining not to permit the recording of the first record information in the recording area;

recording, the first record information related in the recording area in response to said requesting of the recording of the first record information, and deleting the second record information from the recording area and thereafter recording the first record information in the recording area in response to said requesting of the deletion of the second record information;

and wherein the first record information is recorded in the recording area when an available capacity of the external device is at or above a predetermined level, and is prevented from being recorded in the recording area when the available capacity of the external device is below the predetermined level, in response to said requesting of the deletion of the second record information;

and executing the process in response to said recording of the first record information in the recording area.

6. The record information recording method as claimed in claim 5, wherein identification information of a user pertaining to the request is included in the first record information in said recording of the first record information.

7. The record information recording method as claimed in claim 5, wherein identification information of the application program pertaining to the request is included in the first record information in said recording of the first record information.

8. The record information recording method as claimed in claim 5, wherein a parameter of the process is included in the first record information in said recording of the first record information.

9. A non-transitory computer program product for being executed on a computer, comprising:

computer readable program means for causing the computer to determine, in response to a request to execute a process from an application program, whether to permit recording of first record information related to the process in a recording area of a storage part;

request the recording of the first record information in the recording area in response to said determining to permit the recording of the first record information, and transmit a duplicate of second record information recorded in the recording area to an external device and request deletion of the second record information from the recording area in response to said determining not to permit the recording of the first record information in the recording area;

record the first record information in the recording area in response to said requesting of the recording of the first record information, and delete the second record information from the recording area and thereafter record the first record information in the recording area in response to said requesting of the deletion of the second record information;

and wherein the first record information is recorded in the recording area when an available capacity of the external device is at or above a predetermined level, and is prevented from being recorded in the recording area when the available capacity of the external device is below the predetermined level, in response to said requesting of the deletion of the second record information;

and execute the process in response to said recording of the first record information in the recording area.

10. The non-transitory computer program product as claimed in claim 9, wherein said computer readable program means further causes the computer to include identification information of a user pertaining to the request in the first record information in said recording.

11. The non-transitory computer program product as claimed in claim 9, wherein said computer readable program means further causes the computer to include identification information of the application program pertaining to the request in the first record information.

12. The non-transitory computer program product as claimed in claim 9, wherein said computer readable program means further causes the computer to include a parameter of the process in the first record information.

13. The device as claimed in claim 1, wherein the recording part is configured to include identification information pertaining to the request in the first record information.

14. The record information recording method as claimed in claim 5, wherein identification information pertaining to the request is included in the first record information in said recording of the first record information.

15. The non-transitory computer program product as claimed in claim 9, wherein said computer readable program means further causes the computer to include identification information pertaining to the request in the first record information.

* * * * *